United States Patent
Xiao et al.

(10) Patent No.: US 10,338,945 B2
(45) Date of Patent: Jul. 2, 2019

(54) HETEROGENEOUS FIELD DEVICES CONTROL MANAGEMENT SYSTEM BASED ON INDUSTRIAL INTERNET OPERATING SYSTEM

(71) Applicant: KYLAND TECHNOLOGY CO., LTD., Beijing (CN)

(72) Inventors: Lei Xiao, Beijing (CN); Erfei Yin, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 15/638,495

(22) Filed: Jun. 30, 2017

(65) Prior Publication Data

US 2018/0225135 A1    Aug. 9, 2018

(30) Foreign Application Priority Data

Feb. 9, 2017 (CN) .......................... 2017 1 0071692

(51) Int. Cl.
*G06F 9/455* (2018.01)
*G05B 19/042* (2006.01)
(Continued)

(52) U.S. Cl.
CPC ..... *G06F 9/45533* (2013.01); *G05B 19/0421* (2013.01); *G05B 19/056* (2013.01);
(Continued)

(58) Field of Classification Search
CPC .................. G06F 9/45533; G05B 19/0421
(Continued)

(56) References Cited

U.S. PATENT DOCUMENTS 7,478,204 B2 * 1/2009 McKenney ............... G06F 9/52
                                                711/151
8,333,321 B2 * 12/2012 Gressel ................. G06Q 10/02
                                                235/382
(Continued)

FOREIGN PATENT DOCUMENTS

WO    2011/150929 A1    12/2011

OTHER PUBLICATIONS

Sironi, Filippo, et al. "Self-aware adaptation in FPGA-based systems." Field Programmable Logic and Applications (FPL), 2010 International Conference on. IEEE, 2010.pp. 187-192 (Year: 2010).*

(Continued)

*Primary Examiner* — Satish Rampuria
(74) *Attorney, Agent, or Firm* — Arent Fox LLP; Michael Fainberg

(57) ABSTRACT

Disclosed is a heterogeneous field devices control management system based on an industrial internet operating system. In order to solve the problems that it is difficult to add new heterogeneous field devices to an existing system, as well as that the system has low security and a real-time performance, on one hand, according to embodiments of the present disclosure, on the basis of the differences of real-time requirements of services operated by heterogeneous field devices, a real-time virtual machine processes a real-time service and a non-real-time virtual machine processes a non-real-time service, thus different operating environments could be customized for a real-time service and a non-real-time service, avoiding the situation that when a system upgrade is made for a non-real-time service or a non-real-time virtual service fails, a real-time service is also affected, service isolation is realized, and, stability and reliability of industrial field control are enhanced.

9 Claims, 2 Drawing Sheets

(51) Int. Cl.
*G05B 19/05* (2006.01)
*G06F 9/46* (2006.01)
*G06F 21/57* (2013.01)
*G06F 21/53* (2013.01)
*G06F 9/38* (2018.01)
*G05B 23/02* (2006.01)
*H04L 29/06* (2006.01)

(52) U.S. Cl.
CPC ....... *G05B 23/0218* (2013.01); *G06F 9/3855* (2013.01); *G06F 9/45558* (2013.01); *G06F 9/46* (2013.01); *G06F 21/53* (2013.01); *G06F 21/57* (2013.01); *H04L 63/101* (2013.01); *H04L 63/14* (2013.01); *G06F 2009/45579* (2013.01); *G06F 2009/45587* (2013.01)

(58) Field of Classification Search
USPC ...................................................... 718/1–108
See application file for complete search history.

(56) References Cited

U.S. PATENT DOCUMENTS

| | | | | |
|---|---|---|---|---|
| 8,627,312 B2* | 1/2014 | Weber | ................ | G06F 9/45533 711/114 |
| 9,081,602 B1* | 7/2015 | Omelyanchuk | ..... | G06F 11/3644 |
| 9,201,671 B2* | 12/2015 | Vincent | ............... | G06F 9/45558 |
| 9,450,836 B2* | 9/2016 | Hammer | ................ | H04L 41/50 |
| 2003/0236748 A1* | 12/2003 | Gressel | ............... | G06Q 20/105 705/41 |
| 2005/0251806 A1* | 11/2005 | Auslander | .......... | G06F 9/45533 718/100 |
| 2013/0166703 A1* | 6/2013 | Hammer | ................ | H04L 41/50 709/220 |

OTHER PUBLICATIONS

Dong, Xinshu, et al. "Software-defined networking for smart grid resilience: Opportunities and challenges." Proceedings of the 1st ACM Workshop on Cyber-Physical System Security. ACM, 2015. pp. 61-68 (Year: 2015).*

Hahn, Adam, et al. "Development of the PowerCyber SCADA security testbed." Proceedings of the sixth annual workshop on cyber security and information intelligence research. ACM, 2010. pp. 1-4 (Year: 2010).*

G. Popek et al. "Formal Requirements for Virtualizable Third Generation Architectures" Communications of the AC, Association for Computing Machinery Inc. vol. 17, No. 7, Jul. 1, 1974.

* cited by examiner

US 10,338,945 B2

HETEROGENEOUS FIELD DEVICES CONTROL MANAGEMENT SYSTEM BASED ON INDUSTRIAL INTERNET OPERATING SYSTEM

This application claims the benefit of Chinese Patent Application No. 201710071692.2, filed with the State Intellectual Property Office of People's Republic of China on Feb. 9, 2017, and entitled "Heterogeneous Field Devices Control Management System Based on an Industrial Internet Operating System", the content of which is hereby incorporated by reference in its entirety.

FIELD

The present disclosure relates to the field of industrial field control management technology, and particularly to a heterogeneous field devices control management system based on an industrial internet operating system.

BACKGROUND

Management of heterogeneous field devices, i.e. devices made by different manufacturers, initially was realized by embedding software of a main controller into multiple hardware devices connected to the main controller. However, it is difficult to embed software into various manufacturers' hardware devices. Subsequently, multiple hardware devices are virtual software-defined in a centralized way in an industrial server, and control of the multiple hardware devices are realized through virtual software.

The soft programmable logic controller (PLC), soft computer numerical control (CNC) and soft numerical control (NC), being cost-effective, are able to take advantage of various operating environments, and to be widely applied in the industrial control field.

At present, there are two solutions of integrating the functions of a soft PLC, a soft CNC or a soft NC into an industrial system.

One solution is to integrate the functions of a soft PLC, a soft NC or a soft CNC into a main stream operating system (such as windows) as an application program, whose operating environment is a process state in the operating system.

The other solution is to integrate the functions of a soft PLC, a soft NC or a soft CNC into a main stream operating system (such as windows) as a system service, whose operating environment is a process state with high scheduling priority in the operating system.

However, these two solutions don't solve the problems of the lack of isolation, security and reliability of various services (mainly management services and industrial field control services) of a soft PLC, a soft NC or a soft CNC, and don't meet certain industrial requirements which require high isolation, security and reliability of services. For example, when a system is supposed to be upgraded, or, a misoperation or a malicious virus attack occurs, it would cause all the services to be interrupted or run abnormally. Moreover, hackers are familiar with main stream operating systems such as windows, and thus main stream operating systems are vulnerable to hackers' attacks.

SUMMARY

Embodiments of the disclosure provide a heterogeneous field devices control management system based on an industrial internet operating system, in order to solve problems such as currently industrial requirements which require high isolation, security and reliability of services can't be satisfied.

In an aspect, embodiments of the disclosure provides a heterogeneous field devices control management system based on an industrial internet operating system, the system including a virtual machine management layer, a real-time virtual machine, and a non-real-time virtual machine, where the virtual machine management layer is configured for the configuration, operating scheduling and hardware access management of the real-time virtual machine and the non-real-time virtual machine;

the real-time virtual machine communicates with heterogeneous field devices, and is configured to control heterogeneous field devices to perform corresponding operations; and the non-real-time virtual machine is configured to communicate with an off-site device and process a specified service without a real-time requirement.

Optionally, the virtual machine management layer is further configured to, if an instruction is received, judges whether or not the instruction is in a preset blacklist, if it is, discard the instruction, and if it isn't, execute the instruction, where the instruction includes a privileged instruction and/or a sensitive instruction.

Optionally, the real-time virtual machine and the non-real-time virtual machine are each installed with a plurality of service instances, and the real-time virtual machine and the non-real-time virtual machine are specifically configured to:

for any service instance, if the service instance transmits information to a destination service instance, ascertain the server where the destination service instance is in a way of logical addressing;

if the service instance is in a same server as the destination service instance, submit the information to an internal transmission queue, and transmit the information to the destination service instance through the internal transmission queue; and if the service instance and the destination service instance are in different servicers, call an interface driver to transmit the information to the destination service instance.

Optionally, the real-time virtual machine and the non-real-time virtual machine are each installed with a plurality of service instances, and the real-time virtual machine and the non-real-time virtual machine are specifically configured to:

for any service instance, if the service instance transmits information to a destination service instance, ascertain a physical communication interface the service instance is bound to, according to an one-to-one binding relationship between a service instance and a physical communication interface, and transmit the information to the destination service instance via the physical communication interface bound to the service instance.

Optionally, the real-time virtual machine and the non-real-time virtual machine are further configured to:

for any service instance, use a kernel or hyper-threading preset bound to the service instance to process a service of the service instance.

Optionally, the non-real-time virtual machine is specifically configured to:

communicate with an off-site device through a hardware accessing resource of a pre-bound network port in an exclusive way.

Optionally, if the real-time virtual machine and the non-real-time virtual machine share a computing resource of the system, the real-time virtual machine has the authority to preferentially occupy the computing resource.

Optionally, the real-time virtual machine and the non-real-time virtual machine are specifically configured to, for a service to be processed, ascertain a processing priority corresponding to the service to be processed, according to a corresponding relationship between a pre-configured service and a processing priority, where the higher a service's real-time requirement is, the higher the service's processing priority is;

determine a time slice of the service to be processed according to the ascertained processing priority, where the higher the processing priority is, the closer the time slice determined is from current time; and process the service to be processed in the time slice determined.

Optionally, the system is a multi-kernel system with at least two kernels, and the real time virtual machine and the non-real-time virtual machine each occupy different kernels.

Optionally, the virtual machine management layer is further configured to:

for each instruction, make a record of the processing time and processing result of the instruction as well as an identification of the sender which transmits the instruction in a preset accessing information record.

The benefits of the embodiments of the present application are as follows: according to the embodiments of the present application, services with different real-time requirements are separated through virtualization technology and executed by different virtual machines. By a real-time virtual machine processing real-time service and a non-real-time virtual machine processing a non-real-time service, operating environments of different virtual machines could be made different, thus customizing different operating environments for a real-time service and a non-real-time service. When a system upgrade is made with respect to a non-real-time service, or a non-real-time service fails, a real-time service wouldn't be affected, thus enhancing the stability and reliability of industrial control. In this way, industrial requirements of high service isolation, security or reliability can be met.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

An industrial internet operating system is the basic technology to realize networked industrial control, cloud control, visualized factory, industrial big data analytics and so on. It is also a unified platform for realizing the integration of a control information flow, a management information flow and a supply chain information flow, and a safe and controllable safeguard of the new generation industrial system.

Figure 1:
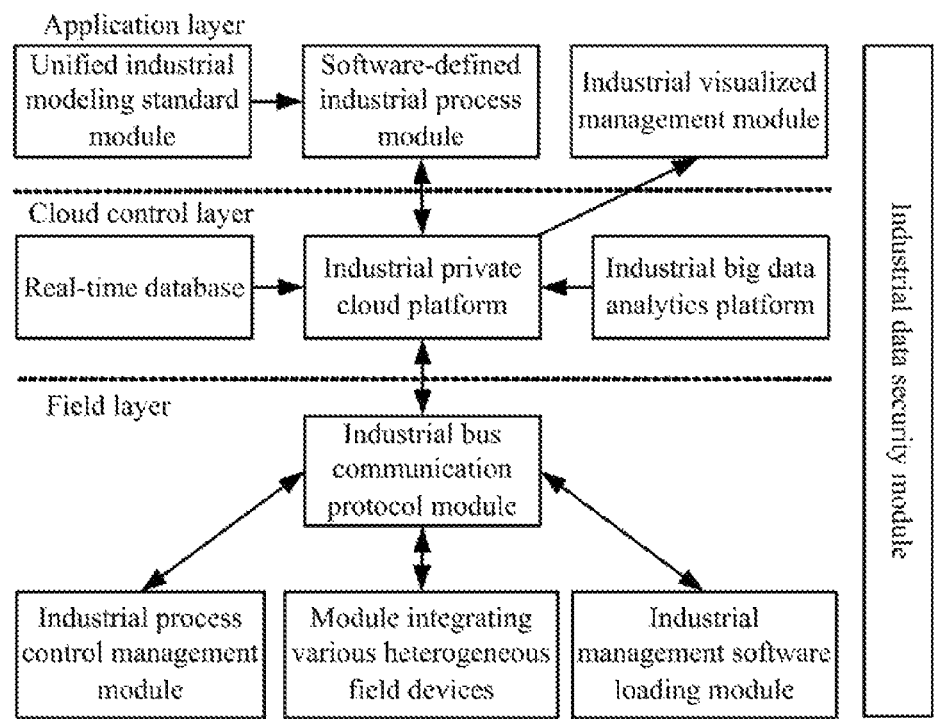
FIG. 1 is an architectural diagram of an industrial internet operating system according to some embodiments of the disclosure.

FIG. 1 illustrates an architectural diagram of an industrial internet operating system, where the industrial internet operating system includes an application layer, a cloud control layer and a field layer. The application layer includes a unified industrial modeling standard module, a software-defined industrial process module and an industrial visualized management module. The cloud control layer includes a real-time database, an industrial private cloud platform and an industrial big data analytics platform. The field layer includes an industrial bus communication protocol module, an industrial process control management module, a module integrating various heterogeneous field devices and an industrial management software loading module, as well as an industrial data security module covering the application layer, the cloud control layer and the field layer.

The heterogeneous field devices control management system based on an industrial internet operating system provided by the present disclosure is related to the part of the module integrating various heterogeneous field devices. According to technical solutions provided by the present disclosure, the management system includes a real-time virtual machine and a non-real-time virtual machine, where the real-time virtual machine communicates with heterogeneous field devices, and is configured to control heterogeneous field devices to perform corresponding operations; and the non-real-time virtual machine communicates with an off-site device and is configured to process a specified service without a real-time requirement. In this way, services with different real-time requirements are separated through virtualization technology and executed by different virtual machines. By a real-time virtual machine processing real-time service and a non-real-time virtual machine processing a non-real-time service, operating environments of different virtual machines could be made different, thus customizing different operating environments for a real-time service and a non-real-time service. In this way, industrial requirements of high service isolation, security or reliability can be met.

Example embodiments will now be described more fully with reference to the accompanying drawings.

Figure 2:
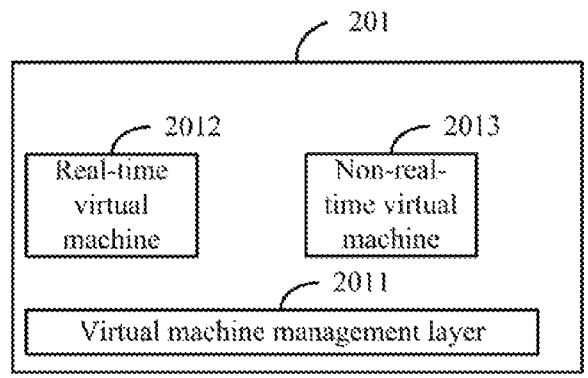
FIG. 2 is a structural schematic diagram of a heterogeneous field devices control management system based on an industrial internet operating system according to some embodiments of the disclosure.

As illustrated in FIG. 2, a heterogeneous field devices control management system based on an industrial internet operating system 201 according to embodiments of the present disclosure, the system including a virtual machine management layer 2011, a real-time virtual machine 2012, and a non-real-time virtual machine 2013, where the virtual machine management layer is configured for the configuration, operating scheduling and hardware access management of the real-time virtual machine and the non-real-time virtual machine;

the real-time virtual machine communicates with heterogeneous field devices, and is configured to control heterogeneous field devices to perform corresponding operations; and the non-real-time virtual machine is configured to communicate with an off-site device and process a specified service without a real-time requirement.

In one embodiment, the real-time virtual machine runs a soft PLC, a soft CNC or a soft NC to control the heterogeneous field devices to perform corresponding operations.

The non-real-time virtual machine could achieve human-machine interface interaction and data acquisition and monitoring, and could be responsible for communication and interaction between the system and an off-site device. An off-site device may refer to a device that requires remote communication and is not included in industrial heterogeneous field devices.

In this way, the real-time virtual machine, as a field control system function platform, is able to realize computing control of specific industrial operations of heterogeneous field devices, and to interact with the non-real-time virtual machine.

It needs to be noted that there may be a plurality of real-time virtual machines in a same system, and similarly, there may also be a plurality of non-real-time virtual machines. In practice, the number of real-time virtual machines and the number of non-real-time virtual machines in a same system may be determined according to actual needs, which the present disclosure doesn't limit.

By a real-time virtual machine processing real-time service and a non-real-time virtual machine processing a non-real-time service, operating environments of different virtual machines could be made different, thus customizing different operating environments for a real-time service and a non-real-time service. In addition, when a system upgrade is made with respect to a non-real-time service, or a non-real-time service fails, a real-time service wouldn't be affected, thus enhancing the stability and reliability of industrial control.

In one embodiment, in order to further improve security, a blacklist or white list system may be created for instruction access control. Take blacklist as an example, the virtual machine management layer is also configured to determine whether an instruction is in a preset blacklist if the instruction is received, and if the instruction is in a preset blacklist, discard the instruction; if the instruction is not in a preset blacklist, execute the instruction, where the instruction includes a privileged instruction and/or a sensitive instruction. In this way, there could some measures to protect the system against hacker virus malicious attacks and misoperations, thereby improving the security and reliability of the system.

In addition, the real-time virtual machine and the virtual machine management layer are further configured to: for each instruction, make a record of the processing time and processing result of the instruction as well as an identification of the sender which transmits the instruction in a preset accessing information record. In this way, in the future through the accessing information record, the situation of a specified reception and processing could be understood, thus facilitating follow-up work.

In one embodiment, each the real-time virtual machine and the non-real-time virtual machine are installed with a plurality of service instances, to save input/output (I/O) interface resources, according to embodiments of the present embodiments, the real-time virtual machine and the non-real-time virtual machine are specifically configured to:

for any service instance, if the service instance transmits information to a destination service instance, ascertain the server where the destination service instance is in a way of logical addressing;

if the service instance is in a same server as the destination service instance, submit the information to an internal transmission queue, and transmit the information to the destination service instance through the internal transmission queue; and if the service instance and the destination service instance are in different servicers, call an interface driver to transmit the information to the destination service instance.

That is, virtualized adaption process could be performed on information destined for a same server, so that the information is submitted to an internal transmission queue, and information in the queue is transmitted in turn to corresponding destination service instance(s). While information interactive among different servers is implemented by calling an interface driver. In this way, a mechanism of communication among service instances in different servers is formed with a service instance as the unit of information exchange. This mechanism supports communication across servers as well as communication among various service instances within a server. The solution is highly scalable.

Figure 3:
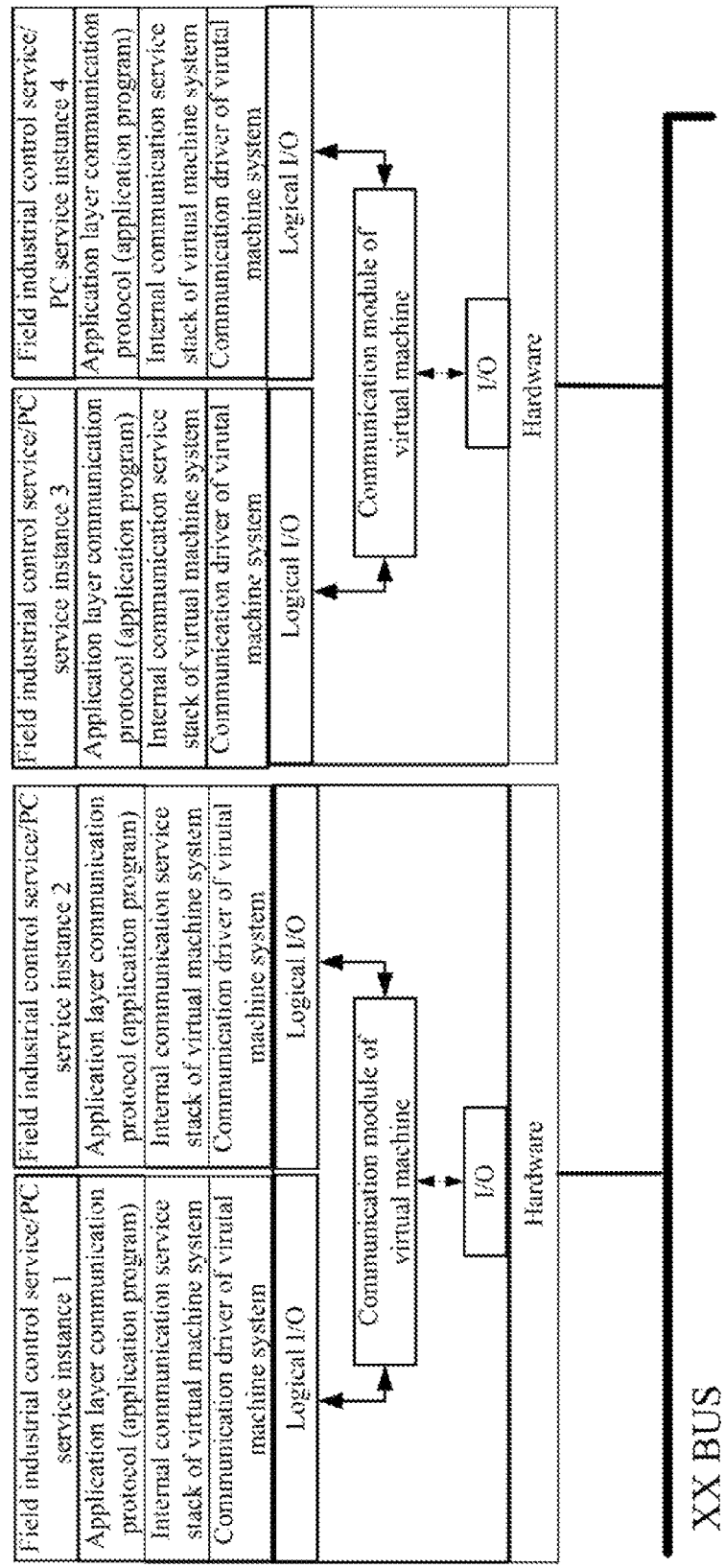
FIG. 3 is a schematic diagram of communication among service instances according to some embodiments of the present disclosure.

For example, FIG. 3 is a schematic diagram of communication among service instances according to some embodiments of the present disclosure, where every service instance has a logical I/O interface, configured to transmit and receive information. In FIG. 3, a virtual machine communication module could monitor information of every service instance under its administration, and if a service instance transmits information to a destination service instance, the virtual machine communication module could ascertain that the service instance and the destination service instance are in the same server and submit the information to an internal transmission queue, and submit the information to the destination service instance via the internal transmission queue; if it determines that the service instance and the destination service are in different servers, it calls an interface driver to transmit the information to the destination service instance.

Moreover, also to support both communications across servers and communication among various service instances within a server, embodiments of the present disclosure could use the following solutions. Specifically, each the real-time virtual machine and the non-real-time virtual machine are installed with a plurality of service instances, and the real-time virtual machine and the non-real-time virtual machine are specifically configured to: for any service instance, if the service instance transmits information to a destination service instance, ascertain a physical communication interface the service instance is bound to, according to an one-to-one binding relationship between a service instance and a physical communication interface, and transmit the information to the destination service instance via the physical communication interface bound to the service instance. In practice, any service instance could use a network port bound to itself in an exclusive way. This solution is suitable for a scenario with sufficient I/O resources and is able to be applied in a service with an isolation requirement.

Of course, in practice, the abovementioned two solutions could be combined. For example, for any service instance, it is first ascertained whether or not the service instance has a bound physical communication interface, and if the service instance has a bound physical communication interface, the service instance's information is transmitted to a destination service instance via the physical communication interface bound to the service instance; if the service instance has not a bound physical communication interface, when the service instance sends information to a destination service instance, a server where the destination service instance is ascertained by logical addressing; if the service instance and the destination service instance are in a same server, the information is submitted to an internal transmission queue, and is then sent to the destination service instance through the internal transmission queue; if the service instance and the destination service are in different servers, an interface driver is called to transmit the information to the destination service instance.

Of course, in practice, a user could determine the way of communication among service instances according to actual needs, which the present disclosure doesn't limit.

In one embodiment, the real-time virtual machine and the non-real-time virtual machine are further configured to: for any service instance, use a kernel or hyper-threading preset bound to the service instance to process a service of the service instance. In this way, a service instance and a computing resource are bound, thus improving processing efficiency of the service instance and further improving the isolation and stability of different services. In practice, a computing resource bound to various service instance may be determined according to actual needs, which the present disclosure doesn't limit.

In one embodiment, in order to improve communication efficiency of a non-real-time virtual machine and an off-site device, the non-real-time virtual machine is specifically configured to: communicate with an off-site device through a hardware accessing resource of a pre-bound network port in an exclusive way. In this way, by further binding hardware resources, isolation between services and system operating security are realized and service processing efficiency are improved.

In one embodiment, if the real-time virtual machine and the non-real-time virtual machine share a computing resource of the system, in order to ensure that a real-service is operated normally, the real-time virtual machine has the authority to preferentially occupy the computing resource.

Specifically, for a service to be processed, a processing priority corresponding to the service to be processed could be ascertained, according to a corresponding relationship between a pre-configured service and a processing priority, where the higher a service's real-time requirement is, the higher the service's processing priority is;

a time slice of the service to be processed is determined according to the processing priority ascertained, where the higher the processing priority is, the closer the time slice determined is from current time; and the service to be processed is processed in the time slice determined.

In other words, a real-time service is preferentially processed in a way of time slices and priority.

Of course, for the real-time virtual machine, if a plurality virtual machines share a computing resource, processing priorities of service instances of these virtual machines could be pre-configured and the service instances are processed in allocated time slices in high-to-low order of the priorities, in accordance with the abovementioned method. That is, a service instance with a high priority has an authority to preferentially occupy the computing resource. Of course, if a plurality of non-real-time virtual machines share a computing resource, the processing method would be the same, which is not to be described here.

In one embodiment, if the system is a multi-kernel system with at least two kernels, in order to further enhance the isolation between a real-time service and a non-real-time service and their processing efficiency, the real time virtual machine and the non-real-time virtual machine each occupy different kernels. For example, if the system has double kernels, one kernel could be allocated to a real-time virtual machine and the other kernel could be allocated to a non-real-time virtual machine.

In practice, for a double-kernel system, a real-time virtual machine and a non-real-time virtual machine are obtained by virtualized computing, and service instances are installed in each virtual machine, a hardware resource (such as a computing resource or a communication interface) bound to each service instance is allocated to each service instance correspondingly, and a processing priority could be further allocated for each service instance. Meanwhile, a blacklist or a white list could also be configured to protect the system's security by controlling instructions.

In one embodiment, when a system has multiple kernels, and a real-time virtual machine and a non-real-time virtual machine occupy different kernels, for a kernel occupied by a real-time virtual machine, a priority for scheduling kernel resources could be allocated for a specified service instance according to the specified service instance installed in the real-time virtual machine, or, a kernel could be bound to a specified service instance to process service of the specified service instance, which could be set according to actual needs in practice and the present disclosure doesn't limit.

It should be appreciated by those skilled in the art that embodiments of the present disclosure may be provided as a method, a system, or a computer program product. Therefore, the present disclosure may take the form of a complete hardware embodiment, a complete software embodiment, or an embodiment combing software and hardware aspects. Moreover, the present disclosure may take the form of a computer program product implemented in one or more computer usable storage media (including but not limited to disk storage, a CD-ROM, or an optical memory) in which computer usable program codes are included.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A heterogeneous field devices control management system based on an industrial internet operating system, wherein the heterogeneous field devices control management system comprises a plurality of servers, each of the plurality of servers comprises a memory storing first instructions, a physical communication interface and at least one processor; wherein a virtual machine management layer, a real-time virtual machine, and a non-real-time virtual machine are operated on the each of the plurality of servers, and each the real-time virtual machine and each the non-real-time virtual machine are respectively installed with a plurality of service instances; and wherein the at least one processor is configured to read and execute the first instructions to:

control the virtual machine management layer to perform a configuration, operating scheduling and hardware access management of the real-time virtual machine and the non-real-time virtual machine;

control the real-time virtual machine to communicate with heterogeneous field devices, and to control the heterogeneous field devices to perform corresponding operations;

control the non-real-time virtual machine to communicate with an off-site device and process a specified service without a real-time requirement; and control the real-time virtual machine and the non-real-time virtual machine to:

for any service instance, ascertain whether or not the service instance has a bound physical communication interface, according to an one-to-one binding relationship between a service instance and a physical communication interface;

when the service instance has a bound physical communication interface, transmit information of the service instance to a destination service instance via the bound physical communication interface; and when the service instance does not have a bound physical communication interface, ascertain a server where the destination service instance is located by means of logical addressing, upon sending the information of the service instance to the destination service instance; submit the information of the service instance to an internal transmission queue when the service instance and the destination service instance are in a same server, and send the information of the service instance to the destination service instance via the internal transmission queue; or call an interface driver to transmit the information of the service instance to the destination service instance, when the service instance and the destination service instance are in different servers.

2. The heterogeneous field devices control management system according to claim 1, wherein the at least one processor is configured to read and execute the first instructions to control the virtual machine management layer to, when a second instruction is received; judge whether or not the second instruction is in a preset blacklist, when a second instruction is in the preset blacklist, discard the second instruction, and when the second instruction is not in the preset blacklist, execute the second instruction, wherein the second instruction comprises a privileged instruction and/or a sensitive instruction.

3. The heterogeneous field devices control management system according to claim 2, wherein the at least one processor is configured to read and execute the first instructions to control the virtual machine management layer to:

for each second instruction, make a record of the processing time and processing result of the second instruction as well as an identification of the sender which transmits the second instruction in a preset accessing information record.

4. The heterogeneous field devices control management system according to claim 1, wherein the at least one processor is configured to read and execute the first instructions to control the real-time virtual machine and the non-real-time virtual machine to:

for any service instance, use a kernel or hyper-threading preset bound to the service instance to process a service of the service instance.

5. The heterogeneous field devices control management system according to claim 1, wherein the at least one processor is configured to read and execute the first instructions to control the real-time virtual machine and the non-real-time virtual machine to:

for any service instance, use a kernel or hyper-threading preset bound to the service instance to process a service of the service instance.

6. The heterogeneous field devices control management system according to claim 1, wherein the at least one processor is configured to read and execute the first instructions to control the non-real-time virtual machine to:

communicate with an off-site device through a hardware accessing resource of a pre-bound network port in an exclusive way.

7. The heterogeneous field devices control management system according to claim 1, wherein when the real-time virtual machine and the non-real-time virtual machine share a computing resource of the heterogeneous field devices control management system, the real-time virtual machine has the authority to preferentially occupy the computing resource.

8. The heterogeneous field devices control management system according to claim 7, wherein the at least one processor is configured to read and execute the first instructions to control the real-time virtual machine and the non-real-time virtual machine to, for a service to be processed, ascertain a processing priority corresponding to the service to be processed, according to a corresponding relationship between a pre-configured service and a processing priority, wherein the higher a service's real-time requirement is, the higher the service's processing priority is;

determine a time slice of the service to be processed according to the processing priority ascertained, wherein the higher the processing priority is, the closer the time slice determined is from current time; and process the service to be processed in the time slice determined.

9. The heterogeneous field devices control management system according to claim 1, wherein the heterogeneous field devices control management system is a multi-kernel system with at least two kernels, and the real time virtual machine and the non-real-time virtual machine each occupy different kernels.

* * * * *